(No Model.)

L. T. YOUNG.
ATTACHMENT FOR PHOTOGRAPHIC CAMERAS.

No. 317,915. Patented May 12, 1885.

WITNESSES:
James F. Tobin
Harry L. Ashenfelter

INVENTOR:
Lewis T. Young
by his attorneys
Howson & Sons

UNITED STATES PATENT OFFICE.

LEWIS T. YOUNG, OF PHILADELPHIA, PENNSYLVANIA.

ATTACHMENT FOR PHOTOGRAPHIC CAMERAS.

SPECIFICATION forming part of Letters Patent No. 317,915, dated May 12, 1885.

Application filed May 28, 1883. (No model.)

*To all whom it may concern:*

Be it known that I, LEWIS T. YOUNG, a citizen of the United States, and a resident of Philadelphia, Pennsylvania, have invented certain Improvements in Attachments for Photographic Cameras, of which the following is a specification.

The object of my invention is to provide a photographic camera with an attachment whereby the photographer, after the proper focus has been taken and the plate-holder has been applied to the camera, may know exactly the image which will be covered by the plate when the latter is exposed at any moment, and will also know the proportionate size and position which any particular object will occupy in the image on the plate.

My invention is more particularly of use in outdoor photography, and is especially applicable to the taking of instantaneous views of moving objects with the aid of an "instantaneous shutter."

My invention consists in combining with the camera what I term a "finding-glass" or "finder," composed, essentially, of a small lens, diaphragm, and ground glass, as more fully described hereinafter.

Figure 1:
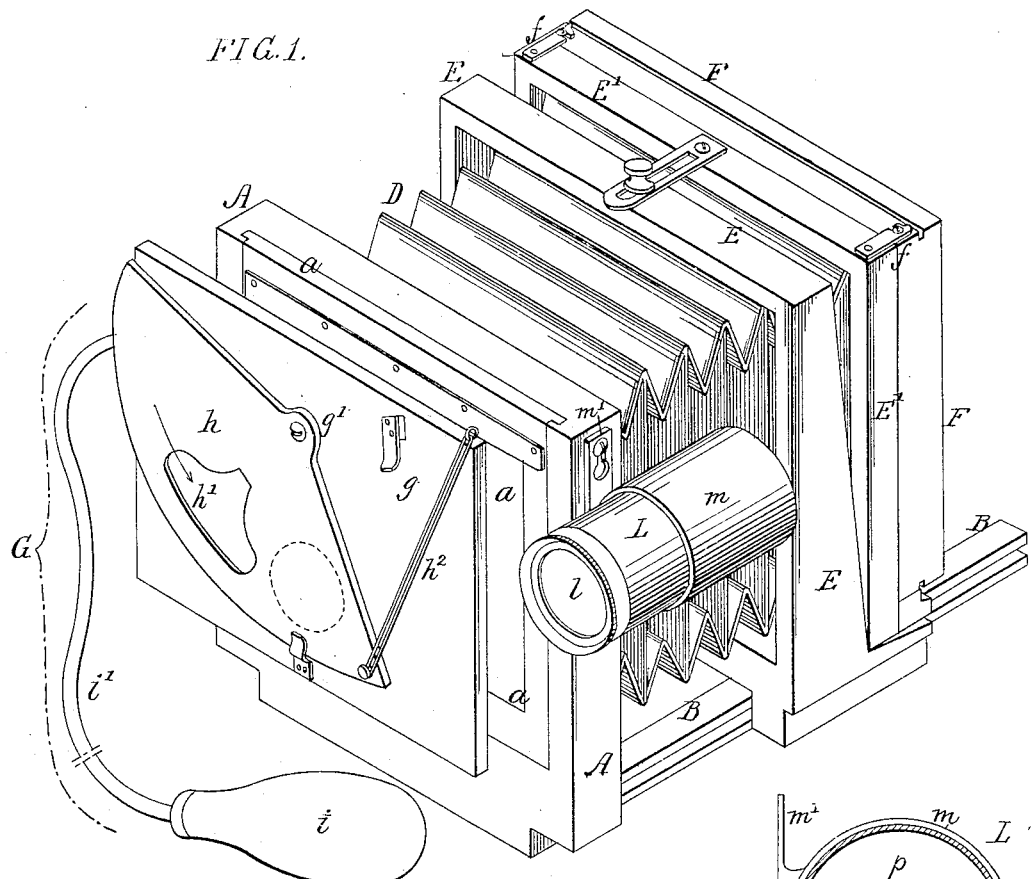
Figure 2:
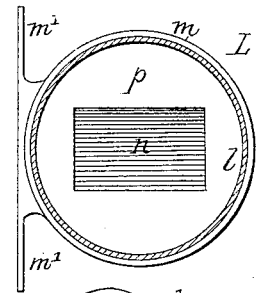

In the accompanying drawings, Figure 1 is a perspective view of a camera provided with an instantaneous shutter and having my improvement. Fig. 2 is an enlarged sectional view of the finding-glass, and Fig. 3 a view of the finding-glass with its principal parts detached.

The camera may be of any usual construction, that shown in Fig. 1 being one of the well-known forms of portable cameras.

A is the front frame, provided with the usual adjustable front plate, $a$, carrying the lens, (indicated by dotted lines.)

B are the slides (one only being visible) on which is guided the sliding back frame, E, carrying the adjustable back E', connected to the front frame by the bellows D. To this back E' may be applied the usual detachable focusing-frame, and when the focus has been obtained the holder, F, for the sensitive plates may be secured in its place, as shown, this holder being secured by hinged catches $f$.

To the front of the lens is attached an instantaneous shutter, G, which may be of any of the well-known forms. In this instance, $g$ is a fixed plate, which carries the movable shutter $h$, with an opening, $h'$, for the momentary exposure. This shutter $h$ is pivoted to the plate $g$ at $g'$, and is acted on by an elastic or other pull-spring, $h^2$, tending to pull it in the direction of the arrow, to pass the opening across the front of the lens, when the catch which holds the shutter is withdrawn by pneumatic pressure due to the squeezing of the elastic bulb $i$. The parts I have described, however, do not in their details form any essential part of my invention, as other forms of camera or shutter may be employed, if desired.

Figure 3:
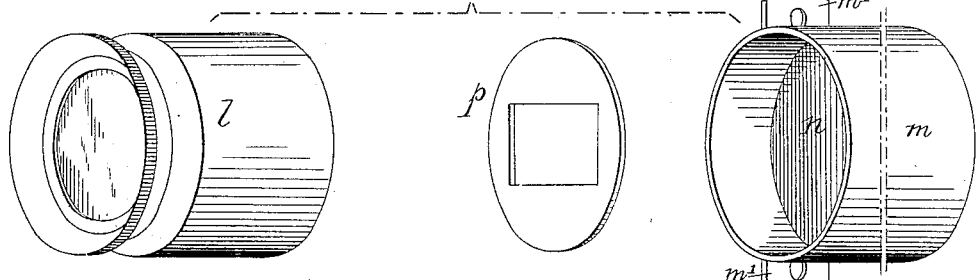

To the side of the front frame, A, of the camera I attach my finder L, Fig. 1, which consists of a cylinder or casing, $m$, carrying a ground glass, $n$, and having ears $m'$ $m'$, Figs. 2 and 3, with slots, Fig. 1, or other means of securing it to the frame so that it can be detached. With this ground glass and casing is combined a lens, $l$, which is preferably adapted to fit within the casing $m$ so that it can readily be removed.

When the camera is set in position to photograph an object, the lens $l$ will reproduce the image on a small scale on the ground glass $n$, and in order to cut this image to the proportionate size of the plate in the holder F, I make use of a diaphragm, $p$, Figs. 2 and 3, placed in juxtaposition to the ground glass $n$. This diaphragm can be removed to make way for another with a different-sized opening, when a lens of a different focal length, or a different-sized sensitive plate, is used. The object of making the lens portion $l$ of the finder removable is to permit of its separate use like any other lens in the well-known manner to get a sharp focus on the glass of the camera focusing-frame.

When the photographer has adjusted his back plate to the proper focus, he removes the focusing-frame, secures the plate-holder F in position, and applies the instantaneous shutter in the position shown. The slide in front of the sensitive plate is then removed, and the photographer watches the reproduction of the image on the glass $n$ of the finder until he gets the object to be photographed (say a boat or vessel moving on the water) imaged to the desired position and proportionate size; then by compressing the bulb $i$ the retaining-catch will be withdrawn, and the shutter $h$ will flash the opening $h'$ past the lens to give the momentary exposure necessary.

I am aware that double cameras have been made so that one part could be used for focusing while the other is used for exposing the plate; but these are objectionable on account of their great bulk. My attachment is comparatively small, can be attached to and detached from any convenient part of the frame, and cannot be used for focusing, as it is independent of the focusing adjustment of the camera.

I claim as my invention—

The combination of a photographic camera with a finding-glass, L, carried by the frame of the camera, but independent of the focusing adjustment of the latter, said finding-glass consisting of a lens, casing, diaphragm, and ground glass, all substantially as set forth.

In testimony whereof I have signed my name to this specification in the presence of two subscribing witnesses.

LEWIS T. YOUNG.

Witnesses:
JOHN E. PARKER,
HUBERT HOWSON.